Dec. 15, 1942. K. NUCHTERLEIN 2,305,303
CAMERA
Filed Sept. 11, 1939 2 Sheets-Sheet 1

INVENTOR
Karl Nuchterlein
Chas. K. Davies + Son
Attys

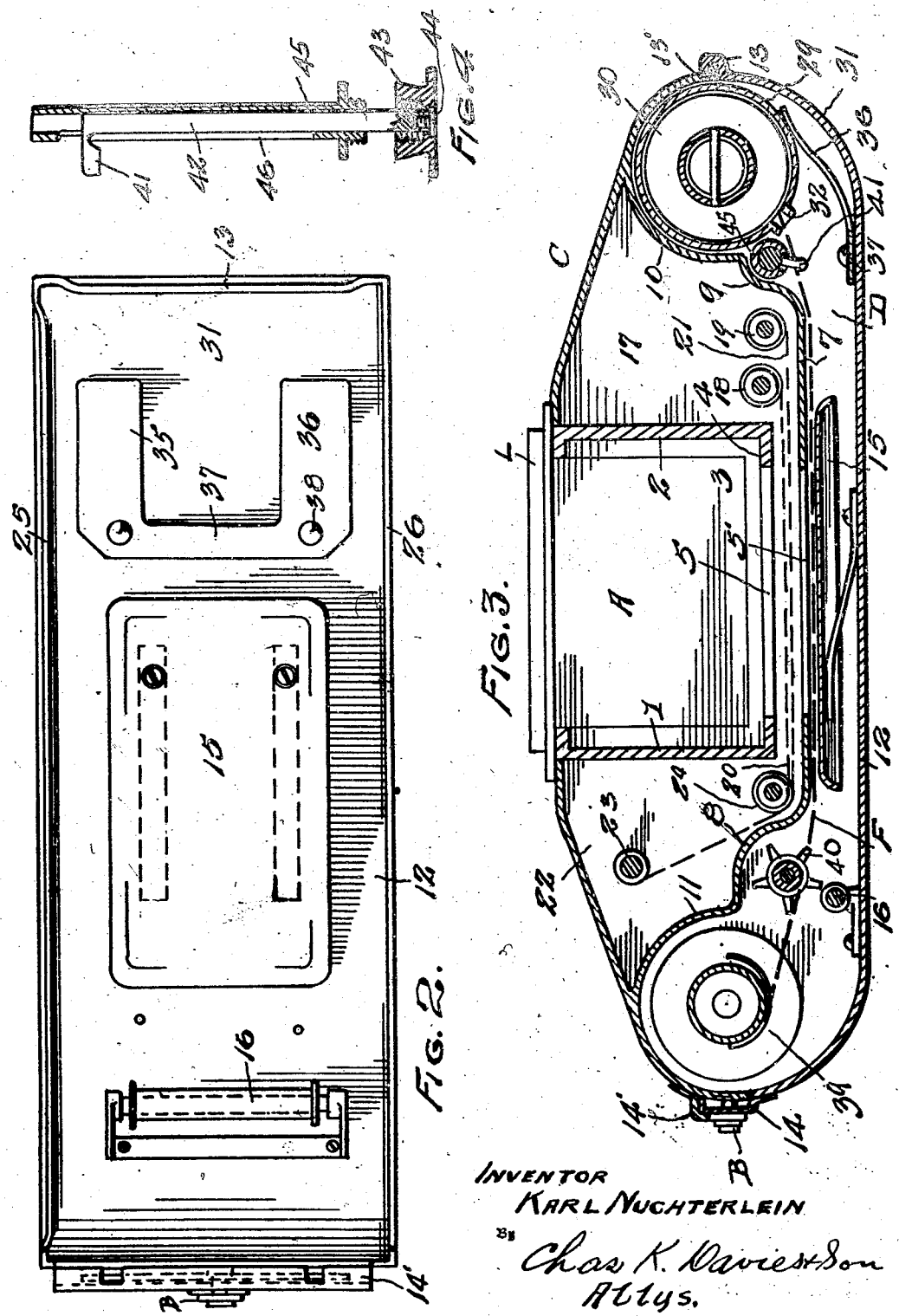

Patented Dec. 15, 1942

2,305,303

UNITED STATES PATENT OFFICE 2,305,303

CAMERA

Karl Nuchterlein, Dresden, Germany; vested in the Alien Property Custodian

Application September 11, 1939, Serial No. 294,360

1 Claim. (Cl. 95—31)

My present invention relates to improvements in cameras, and more particularly to the interior structure and arrangement of interior parts, forming the light chamber and the dark chamber, together with other novel arrangements within the camera casing for the accommodation of operating parts including the film supply and feed, means for severing an exposed portion of the film before the latter is withdrawn from the dark chamber, and other features as will be described.

In the accompanying drawings I have illustrated my invention as embodied in a camera of the reflex, focal-plane or curtain-shutter type adapted to use the standard perforated miniature films, and one of the principal features of my invention is to reduce to a minimum the size and bulk of such cameras, and yet provide for all of the necessary operations with efficiency, precision, and facility.

In order that the invention may be clearly understood I have illustrated some parts incidentally, such as the shutter operating and releasing mechanism set forth in my pending application for Patent Ser. No. 146,485; the presser-plate structure for the film described and claimed in my said pending case, of which the present application is a continuation in part, and other parts are illustrated that have not been disclosed in my prior applications for patent covering different parts of the camera.

In the present application the invention consists essentially in the interior arrangement of the body of the camera wherein the structural arrangements provide a compact and close association of interior parts that are readily accessible when required.

Figure 2 is an inside view of the detachable rear plate or wall of the camera.

Figure 3 is a simplified horizontal sectional view of the camera body as at line 3—3 of Figure 1.

Figure 4 is a sectional view of the film-cutter extracted from the dark chamber of the camera.

Figure 1:
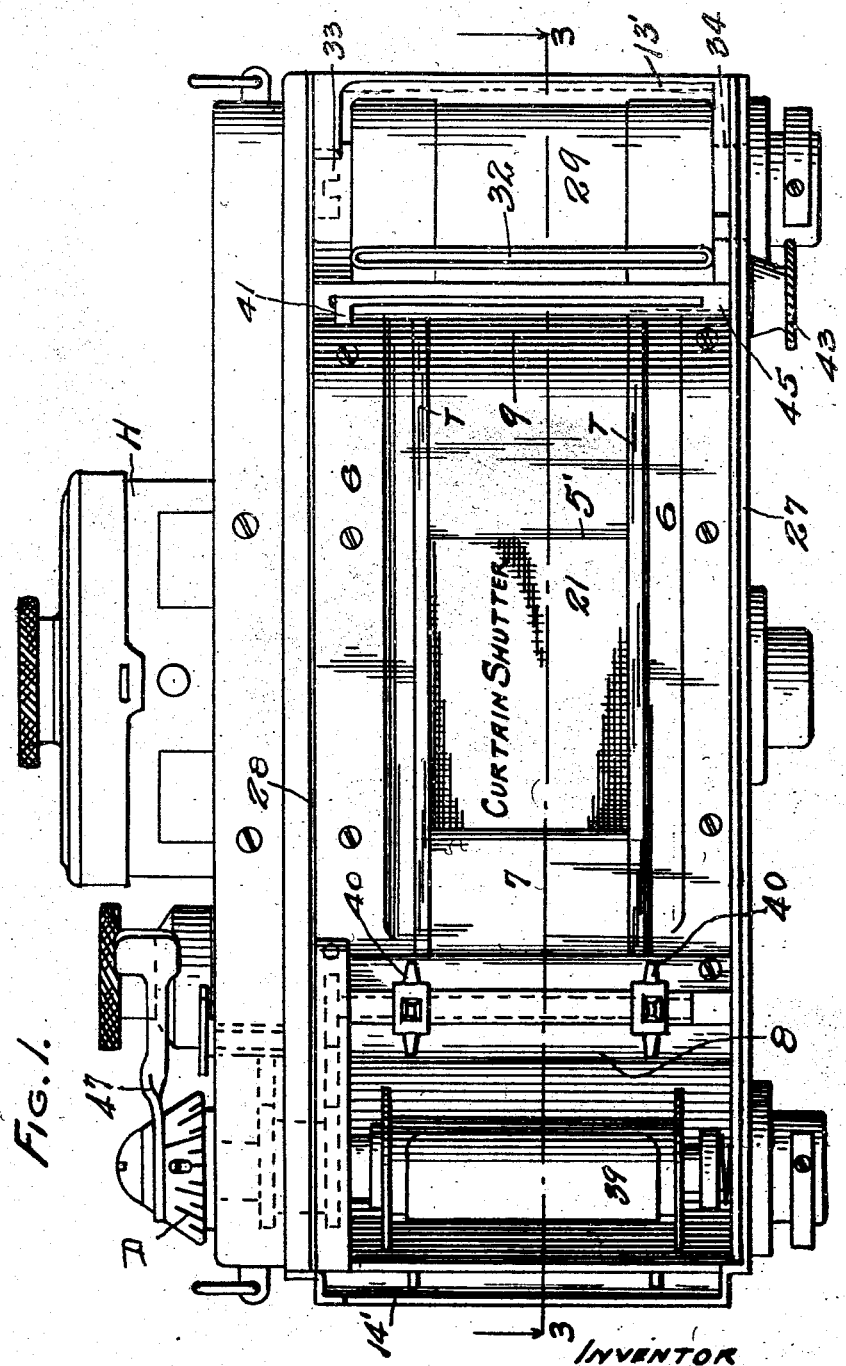
Figure 1 is a rear elevation of a camera embodying my invention, the detachable rear wall being omitted to show the interior arrangement of the dark chamber of the camera.

The body of the camera is illustrated as comprising a casing C, which includes a supporting structure of metal, preferably covered by leather or other suitable material, and the casing, as seen best in Figure 3, is of trapezoidal shape in horizontal cross section.

Means of mounting the lens at the front of the casing are partially indicated at L in Fig. 3, and a hood, indicated as a whole by the letter H is mounted at the top center of the camera, which hood encloses the image-forming ground glass, and other parts not shown.

On the optical axis of the camera and directly to the rear of the lens mount of the camera, an interior, enclosed light chamber A is provided, having side walls 1 and 2, bottom 3, and the rear wall 4 fashioned with an aperture 5 located on the optical axis of the camera.

The camera is divided into several compartments by a longitudinally extending interior partition, shown and indicated in Figure 1 by the numeral 6, and in its simplified form of Figure 3, the partition is shown with a plane central portion 7, which is also fashioned with a rectangular exposure aperture 5', spaced from the rear wall of the light chamber A and directly behind the aperture 5 in wall 4. This interior partition separates the rear portion of the camera into the dark chamber D that extends the full length of the camera body of the camera, and as best seen in Figure 3 the ends of the plane central section 7 of the partition terminates at its ends in crenelations 8 and 9, and beyond these crenelations the partition is formed with semi-circular walls 10 and 11 that merge in suitable manner with the casing wall C.

The rear of the dark chamber is closed by a detachable and removable rear wall or plate 12, which, as seen in Figure 3, at one end is provided with a hinge-hook 13 that engages over a hinge-flange 13' of the casing, and at its other end the rear plate has a latching device 14 that co-acts with a complementary latching device 14' on the casing wall C. By pressing down on the slide button B, the latch 14—14' is released, and then the rear plate 12 may be swung loose from the camera on the hinge-hook 13 13'. In replacing the rear plate 12 the hook 13 is first engaged over the flange 13', the plate is then swung on this hook-hinge toward the camera and the latch-end of the plate is then pressed against the camera to engage the latch device 14—14'.

As indicated in Figures 2 and 3 the inner side of the plate 12 is provided with a resiliently supported presser plate 15, and also a guide roller 16, for guiding the film F across the aperture 5' after an exposure, and for retaining the film in close relationship to the plane section 7 of the partition while an exposure is being made.

The film F it will be understood is provided along its upper and lower edges with perforations as usual, and these edges of the film slide along two very thin tracks T, T, that extend longitudinally of the plane section 7, one above and one below the aperture 5' between the crenelations 8 and 9, as seen in Figure 1, and the presser plate holds the film edges against these flat tracks.

At the right end of the camera in Figure 3 a compartment 17 is provided which is enclosed by portions of the casing, the partition, and a wall of the light chamber, and within this compartment are located the two automatic spring wound rollers 18 and 19 for the two shutter curtains 20 and 21. At the left end of the casing a similar compartment 22 is provided for the re-winding rollers 23 and 24 of the curtains, and these curtains, successively, flash across the narrow space between aperture 5 and the aperture 5' to make the exposure, being automatically wound upon the rollers 18 and 19, when these rollers are released by the usual operating button.

As indicated in Figure 2 the rear removable plate is provided with longitudinally extending inwardly projecting flanges 25 and 26, the former fitting in a bottom groove 27 of the camera body, and the latter fitting in a longitudinally extending slit or slot 28 above the partition as seen in Fig. 1, thus sealing the rear plate in a light-tight manner at the top and bottom of the dark chamber, while the ends of the dark chamber are also sealed in light-tight manner as heretofore described.

The removable and replaceable film-supply cartridge 29 with its interior roll or spool 30 is located in a recess formed by the partition-wall 10, the rounded end of the casing C and the rounded end 31 of the rear removable plate, and the cartridge has the usual slot or mouth 32 through which the film passes as the film is unwound from the spool, and the spool is journaled in open bearings 33 and 34 of the camera body as usual. The cartridge 29 of standard type, it will be understood, is slipped into its bearings to provide a fresh supply of film, and it is also slipped out of its bearings after its film has been used, to be replaced by a new cartridge. To hold the cartridge and the supply spool in its bearings against accidental displacement, I employ two vertically spaced spring blades 35 and 36 integral with a connecting bar 37 and the bar is riveted at 38 to the inside of the removable plate at its curved end 31. These spring blades are designed to bear against the cartridge as in Figure 3 to hold the latter and the spool back in the recess provided for them.

The film-winding spool 39 is journaled in the upper and lower walls of the casing and located in a similar recess at the opposite end of the dark chamber from the cartridge-recess, and the winding spool is rotated from the driving head A of the camera, as indicated in dotted lines in Figure 1.

A pair of spaced star-wheels 40, 40, as shown in Figure 1 by dotted lines, are also operated from the driving head to guide and hold taut the perforated film, and these star wheels are located within the crenelation 8 adjacent the guide roller 16 and the winding spool 39. The star wheels are journaled in bearings in the upper and lower walls of the casing, while the guide roller 16 is journaled in bearings on the inner side of the removable rear plate, and these parts are arranged so that the film, passing between them, is guided to the winding spool 39, which of course is removable.

In some instances, it is desirable to remove the spool 39 with its exposed portion of a film, before the entire length of film has been exposed or withdrawn from the spool 30. For this purpose I employ a film cutter located within the crenelation 9, close to the mouth or slot 32 of the supply spool, and supported at its upper and lower ends in the casing walls. One form of the cutter I employ is best illustrated in Figure 4 where the knife 41 is integral with and projects laterally from a stem 42. At the lower end of the stem, and exterior of the bottom of the casing a nut 43 is held by the screw 44, so that it may be threaded on the lower end of a sleeve 45, which is slotted at 46 to permit the knife to be drawn downwardly across the film to sever the latter. As indicated in Fig. 1 the knife 41 is normally located above the top edge of the film, and the guide sleeve for the knife is clamped in the bottom of the casing by the exterior nut and a flange on the sleeve. When the nut is backed loose from the sleeve, it may be used as a knob or handle to pull the knife 41 across the film to sever the latter.

An operating lever 47 is indicated in Figure 1 for advancing the film one frame at a time past the exposure apertures, and for setting the curtain shutters, and other features of the camera are illustrated for a clear understanding of the invention. Figure 3, it will be understood, is in the nature of an exaggerated exemplification of the invention, the parts being conveniently spaced to permit a clear disclosure of the invention.

Having thus fully described my invention, what I claim as new and desire to secure by Letters Patent is:

The combination with a camera casing of substantially trapezoidal shape, of interior walls forming a light chamber located between the parallel sides of the casing, a longitudinally extending apertured partition between the back wall of the casing and said light chamber and having arcuate offset end portions merging with the front wall of the casing, and a focal plane shutter, said partition, front and back walls and shutter forming a dark chamber having at each end thereof semi-cylindrical film spool receptacles, and intermediate notches in said partition adapted to receive a film guiding device and a film cutting device respectively.

KARL NUCHTERLEIN.